(12) United States Patent
Kray et al.

(10) Patent No.: US 9,121,294 B2
(45) Date of Patent: Sep. 1, 2015

(54) FAN BLADE WITH COMPOSITE CORE AND WAVY WALL TRAILING EDGE CLADDING

(75) Inventors: Nicholas Joseph Kray, Mason, OH (US); Daniel Edward Mollmann, Cincinnati, OH (US); Dong-Jin Shim, Cohoes, NY (US); Trevor Howard Wood, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 802 days.

(21) Appl. No.: 13/331,301

(22) Filed: Dec. 20, 2011

(65) Prior Publication Data
US 2013/0156592 A1 Jun. 20, 2013

(51) Int. Cl.
*F01D 5/28* (2006.01)
*F01D 5/14* (2006.01)

(52) U.S. Cl.
CPC ............... *F01D 5/282* (2013.01); *F01D 5/141* (2013.01); *F05D 2220/36* (2013.01); *F05D 2240/304* (2013.01); *F05D 2250/184* (2013.01); *Y02T 50/672* (2013.01); *Y02T 50/673* (2013.01)

(58) Field of Classification Search
CPC .......... F01D 5/28; F01D 5/282; F01D 5/284; F01D 5/286; F01D 5/141; F05D 2250/184; F05D 2220/36; F05D 2240/304
USPC ....... 416/224, 228, 229 A, 229 R, 230, 236 R
See application file for complete search history.

(56) References Cited

U.S. PATENT DOCUMENTS

| | | | |
|---|---|---|---|
| 1,717,745 | A | 6/1929 | Tismer |
| 1,862,827 | A | 6/1932 | Parsons et al. |
| 2,238,749 | A | 4/1941 | Peltier |
| 2,899,128 | A | 8/1959 | Vaghi |
| 3,365,126 | A | 1/1968 | Stoffer et al. |
| 3,403,893 | A | 10/1968 | Stoffer |

(Continued)

FOREIGN PATENT DOCUMENTS

| | | |
|---|---|---|
| EP | 0244334 A2 | 11/1987 |
| EP | 1574270 A1 | 9/2005 |

(Continued)

OTHER PUBLICATIONS

Search Report and Written Opinion from corresponding EP Application No. 12196898.6, dated Mar. 8, 2013.

*Primary Examiner* — Liam McDowell
(74) *Attorney, Agent, or Firm* — General Electric Company; William Scott Andes

(57) ABSTRACT

A gas turbine engine airfoil includes leading and trailing edges, pressure and suction sides extending from airfoil base to airfoil tip, trailing edge cladding made of cladding material bonded to composite core made of composite material, cladding material less brittle than composite material, composite core including central core portion extending downstream from leading edge portion to trailing edge portion of composite core, and trailing edge cladding including wavy wall and trailing edge. Pressure and suction side flanks of trailing edge cladding may be bonded to pressure and suction side surfaces of trailing edge portion. Waves of wavy wall may extend normal to and away from the pressure and suction side surfaces. Trailing edge cladding may include wavy pressure and suction side trailing edge guards including waves of wavy wall. Airfoil may extend outwardly from platform of a blade. Root may include integral dovetail.

28 Claims, 4 Drawing Sheets

(56) References Cited

U.S. PATENT DOCUMENTS

| | | | |
|---|---|---|---|
| 3,853,428 A | 12/1974 | Hayden et al. | |
| 3,892,612 A * | 7/1975 | Carlson et al. | 156/150 |
| 4,006,999 A | 2/1977 | Brantley et al. | |
| 4,089,618 A | 5/1978 | Patel | |
| 4,108,573 A | 8/1978 | Wagner | |
| 5,375,978 A | 12/1994 | Evans et al. | |
| 5,674,370 A * | 10/1997 | DuPree | 205/67 |
| 5,785,498 A | 7/1998 | Quinn et al. | |
| 6,733,240 B2 * | 5/2004 | Gliebe | 416/228 |
| 7,575,417 B2 | 8/2009 | Finn et al. | |
| 7,640,661 B2 * | 1/2010 | Despreaux et al. | 29/889.7 |
| 7,780,410 B2 | 8/2010 | Kray et al. | |
| 7,896,619 B2 | 3/2011 | Hill et al. | |
| 2003/0071019 A1 * | 4/2003 | Cline et al. | 216/109 |
| 2005/0053466 A1 | 3/2005 | Finn et al. | |
| 2006/0018759 A1 | 1/2006 | Moser | |
| 2008/0152506 A1 * | 6/2008 | Schreiber | 416/229 R |
| 2009/0013532 A1 * | 1/2009 | Wood et al. | 29/889.7 |
| 2009/0035131 A1 | 2/2009 | McMillan | |
| 2010/0329863 A1 | 12/2010 | Kray et al. | |
| 2011/0182740 A1 | 7/2011 | Klinetob et al. | |
| 2012/0152893 A1 * | 6/2012 | Parkos et al. | 216/34 |

FOREIGN PATENT DOCUMENTS

| | | |
|---|---|---|
| EP | 2014870 A2 | 1/2009 |
| WO | 2011064406 | 6/2011 |

* cited by examiner

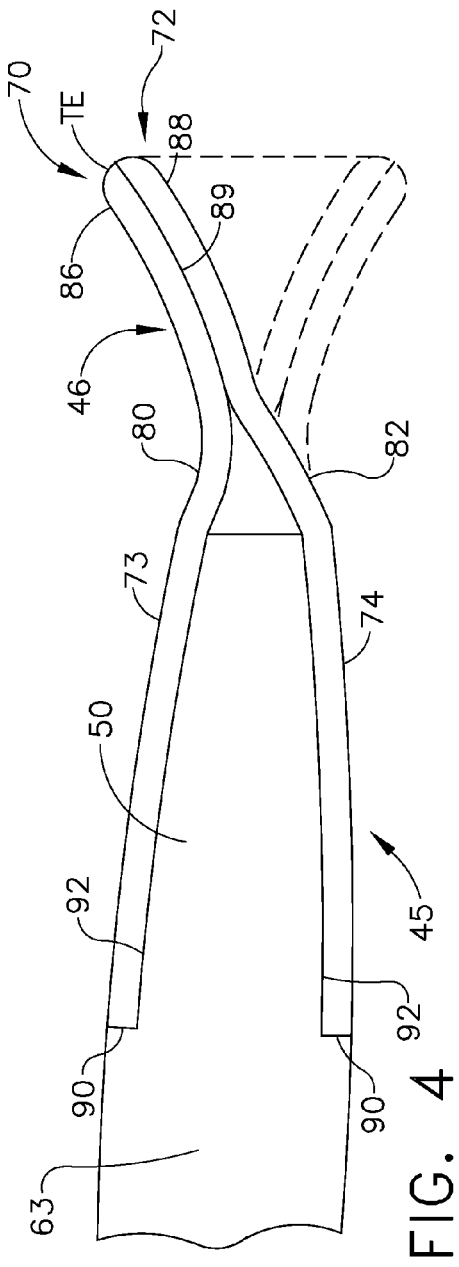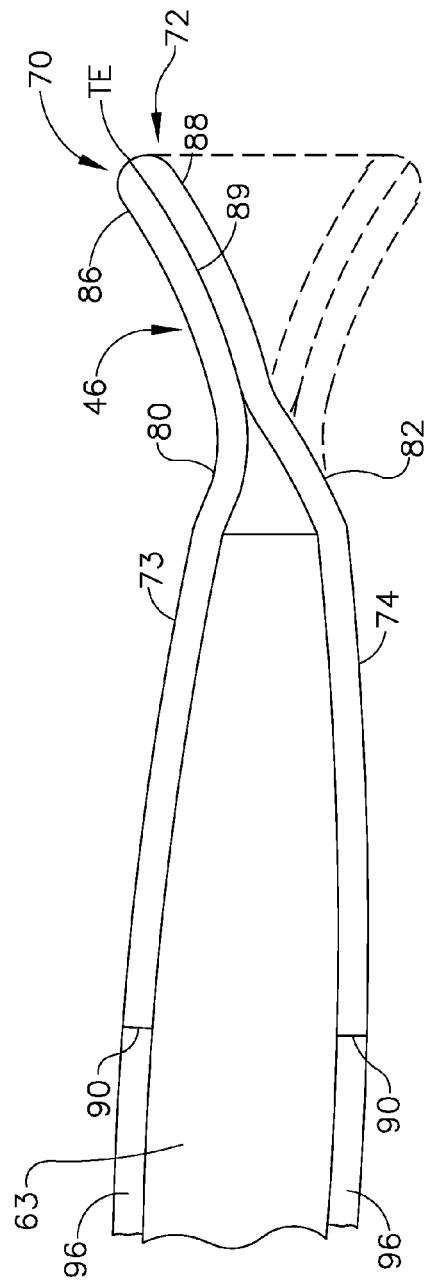

FAN BLADE WITH COMPOSITE CORE AND WAVY WALL TRAILING EDGE CLADDING

BACKGROUND OF THE INVENTION

1. Field of the Invention

The invention relates to rotary machine and gas turbine engine rotor and stator airfoils and, particularly, to composite rotors and stator airfoils.

2. Description of Related Art

Aircraft turbine engines and other typed of rotary machines include a stationary and rotating airfoils which channel an airflow downstream. As a result, a wake flow may be generated and channeled downstream where it may impinge against an object downstream from the airfoils. Wake flow impingement may generate undesirable noise and/or aeromechanical loading. Unwanted noise may be generated by either the upstream rotating airfoil wake impinging on a stator or rotor component downstream from the rotating airfoil, or the upstream stator airfoil wake impinging on a rotating airfoil downstream from the stator airfoil.

The generation of such wake flow may result in a loss of engine performance and engine efficiency. Reduction of the amplitude of the wake flow may reduce the noise and the aeromechanical loading generated when the wake impinges against a downstream object. An airfoil designed to reduce the amplitude and/or coherence of the wake flow, the noise, and the aeromechanical loading is disclosed in U.S. Pat. No. 8,083,487, entitled "AIRFOILS FOR USE IN ROTARY MACHINES AND METHOD FOR FABRICATING SAME", by Trevor Howard Wood et al., which issued Dec. 27, 2011 and is incorporated herein by reference. The airfoil includes suction and pressure sides coupled together at a leading edge and a trailing, wherein the airfoil includes a plurality of first and second chord sections each extending between the trailing and leading edges, wherein at least one of the first chord sections extends outward from the pressure side of the airfoil at the trailing edge, and at least one of the second chord sections extends outward from the suction side of the airfoil at the trailing edge.

Particular embodiments of the airfoil are wavy or crenelated airfoils.

Composite fan blades have been developed for aircraft gas turbine engines to reduce weight and cost, particularly for blades in larger engines. A large engine composite wide chord fan blades offer a significant weight savings over a large engine having standard chorded fan blades. The term composite as used herein may be defined as a material containing a reinforcement such as fibers or particles supported in a binder or matrix material. Composites include metallic and non-metallic composites. One particularly useful embodiment for fan composite fan blades is made of a unidirectional tape material and an epoxy resin matrix. The composite fan blade and other airfoils disclosed herein may include composite materials of the non-metallic type made of a material containing a fiber such as a carbonaceous, silica, metal, metal oxide, or ceramic fiber embedded in a resin material such as Epoxy, Polyimides (commercially known as PMR15), Bismaleimides (BMI), Polyetheretherketone (PEEK), etc. A more particular material includes fibers unidirectionally aligned into a tape that is impregnated with a resin, formed into a part shape, and cured via an autoclaving process or press molding to form a light-weight, stiff, relatively homogeneous article having laminates within.

It is highly desirable to provide light-weight and strong aircraft gas turbine engine fan blades that also reduce the amplitude of wake flow, noise, and aeromechanical loading.

SUMMARY OF THE INVENTION

A gas turbine engine airfoil includes chordwise spaced apart leading and trailing edges, pressure and suction sides extending outwardly in a spanwise direction from an airfoil base to an airfoil tip, trailing edge cladding made of a cladding material bonded to a composite core made of a composite material, the cladding material being less brittle than the composite material, the composite core including a central core portion extending chordwise downstream from a leading edge portion to a trailing edge portion of the composite core, and the trailing edge cladding including a wavy wall and the trailing edge.

The airfoil may include comprising pressure and suction side flanks of the trailing edge cladding bonded to pressure and suction side surfaces respectively of the trailing edge portion of the composite core. Waves of the wavy wall may extend normal to and away from the pressure and suction side surfaces. The metallic trailing edge cladding may include spanwise extending wavy pressure and suction side trailing edge guards which include the waves of the wavy wall.

An erosion coating may be used to cover the composite core and butt up against and hide the forward facing steps on the pressure and suction side flanks of the trailing edge cladding. Alternatively, rebates may extend into the composite core and hide the steps.

A gas turbine engine fan blade may include the airfoil extending outwardly from a platform of the blade. The blade may include a root extending inwardly from the platform and the root may include an integral dovetail.

BRIEF DESCRIPTION OF THE DRAWINGS

The foregoing aspects and other features of the invention are explained in the following description, taken in connection with the accompanying drawings where:

FIG. 4 is a cross-sectional view illustration of a first alternative embodiment of the composite core trailing edge and metallic trailing edge of the blade illustrated in FIG. 3.

FIG. 5 is a cross-sectional view illustration of a second alternative embodiment of the composite core trailing edge and metallic trailing edge of the blade illustrated in FIG. 3.

DETAILED DESCRIPTION OF THE INVENTION

Figure 1:
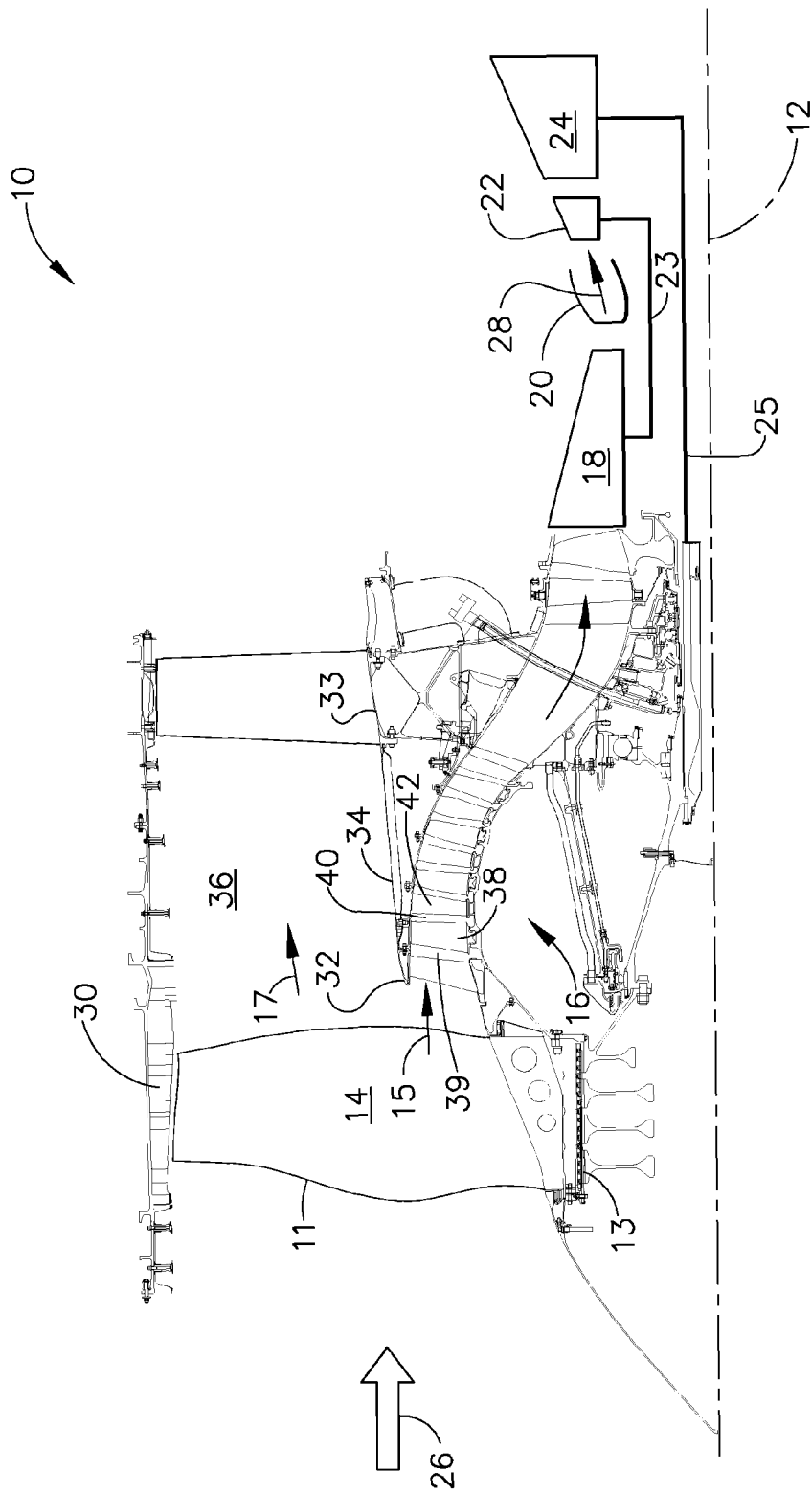
FIG. 1 is a longitudinal part sectional and part diagrammatical view illustration of an exemplary embodiment of an aircraft turbofan gas turbine engine with a composite core fan blade having a metallic wavy wall trailing edge.

Illustrated in FIG. 1 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, a booster 16, a high pressure compressor 18, a combustor 20, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and the booster 16.

In typical operation, air 26 is pressurized by a row of fan blades 11 in the fan 14 and produces an inner air flow 15 channeled through the booster 16 which further pressurizes the inner air flow 15. The pressurized air is then flowed to the high pressure compressor 18 which further pressurizes the air. The pressurized air is mixed with fuel in the combustor 20 for generating hot combustion gases 28 that flow downstream in turn through the HPT 22 and the LPT 24.

A flow splitter 34 surrounding the booster 16 immediately behind the fan 14 includes a sharp leading edge 32 which splits the fan air 26 pressurized by the fan 14 into a radially inner stream (inner air flow 15) channeled through the booster 16 and a radially outer stream (bypass air flow 17) channeled through the bypass duct 36. A fan casing 30 surrounding the fan 14 is supported by an annular fan frame 33. The booster 16 includes alternating annular rows of booster blades and vanes 38, 42 extending radially outwardly and inwardly across a booster flowpath 39 in a booster duct 40. The annular rows of booster blades 38 are suitably joined to the fan 14. The booster 16 is located forward of the fan frame 33 and is disposed radially inboard of the flow splitter 34. The fan 14 includes a plurality of fan blades 11 that extend substantially radially outwardly from a fan rotor disk 13.

Figure 2:
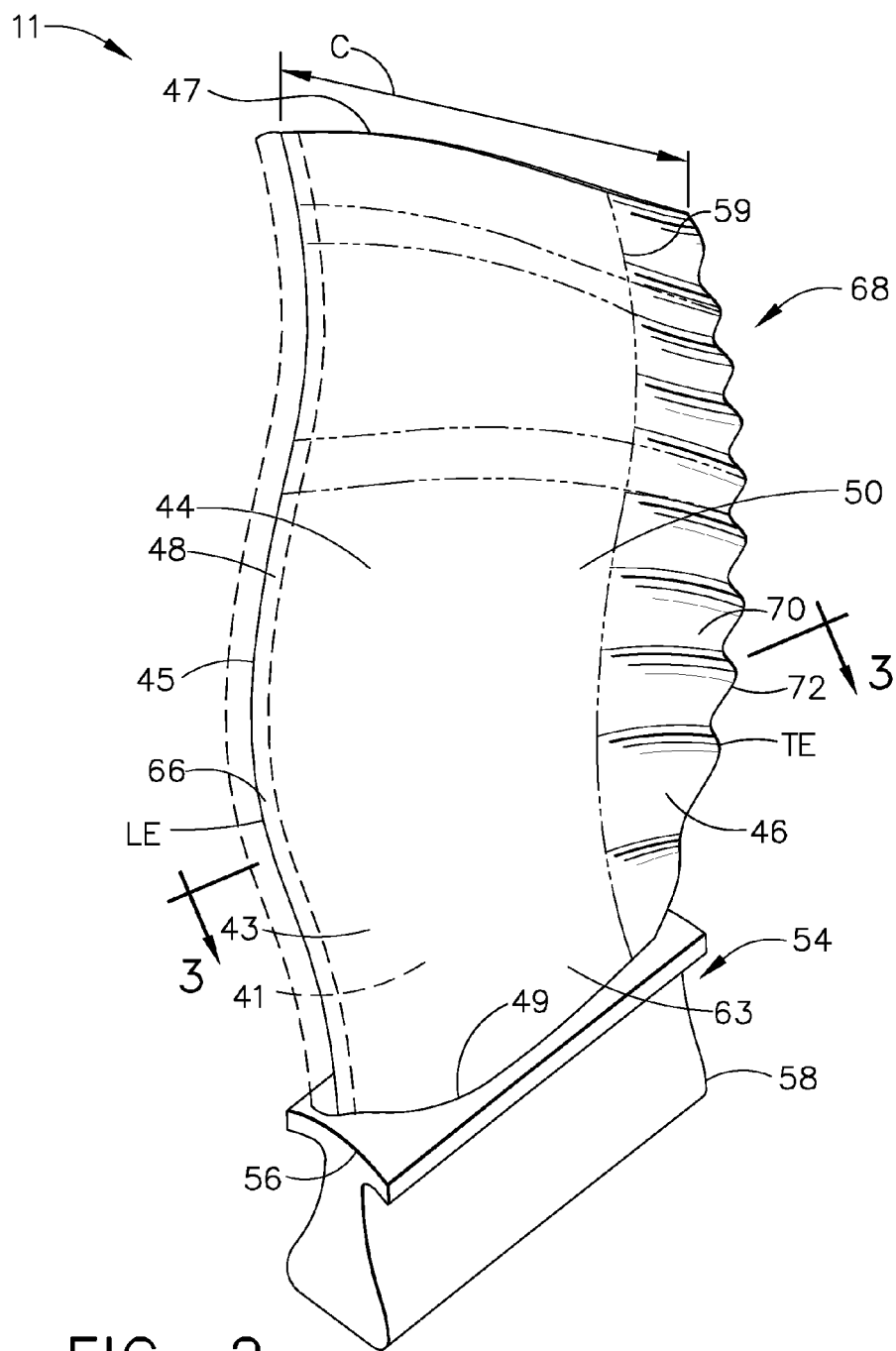
FIG. 2 is a perspective view illustration of the composite core fan blade illustrated in FIG. 1.

Illustrated in FIG. 2 is one embodiment of the fan blade 11 that may be used in engine 10 (illustrated in FIG. 1). The fan blade 11 includes an airfoil 45 extending outwardly from a platform 56 and a root 54 extending inwardly from the platform 56. Alternatively, airfoil 45 may be used with, but not limited to, rotor blades, stator vanes, and/or nozzle assemblies. Airfoil 45 may also be used with, outlet guide vanes (OGVs) and the booster.

In the exemplary embodiment, the root 54 includes an integral dovetail 58 that enables the fan blade 11 to be mounted to the rotor disk 13. The airfoil 45 includes pressure and suction sides 41, 43 extending outwardly in a spanwise direction along a span S from an airfoil base 49 at the platform 56 to an airfoil tip 47. The exemplary pressure and suction sides 41, 43 illustrated herein are concave and convex respectively. The airfoil 45 extends along a chord C between chordwise spaced apart leading and trailing edges LE, TE. The airfoil 45 may be mounted on and integral with a hub instead of the platform and disk to form an integrally bladed rotor (IBR). Alternatively, fan blade 11 may have any conventional form, with or without dovetail 58 or platform 56. For example, fan blade 11 may be formed integrally with disk 13 in a blisk-type configuration that does not include the dovetail 58 and the platform is annular extending around the entire blisk.

Figure 3:
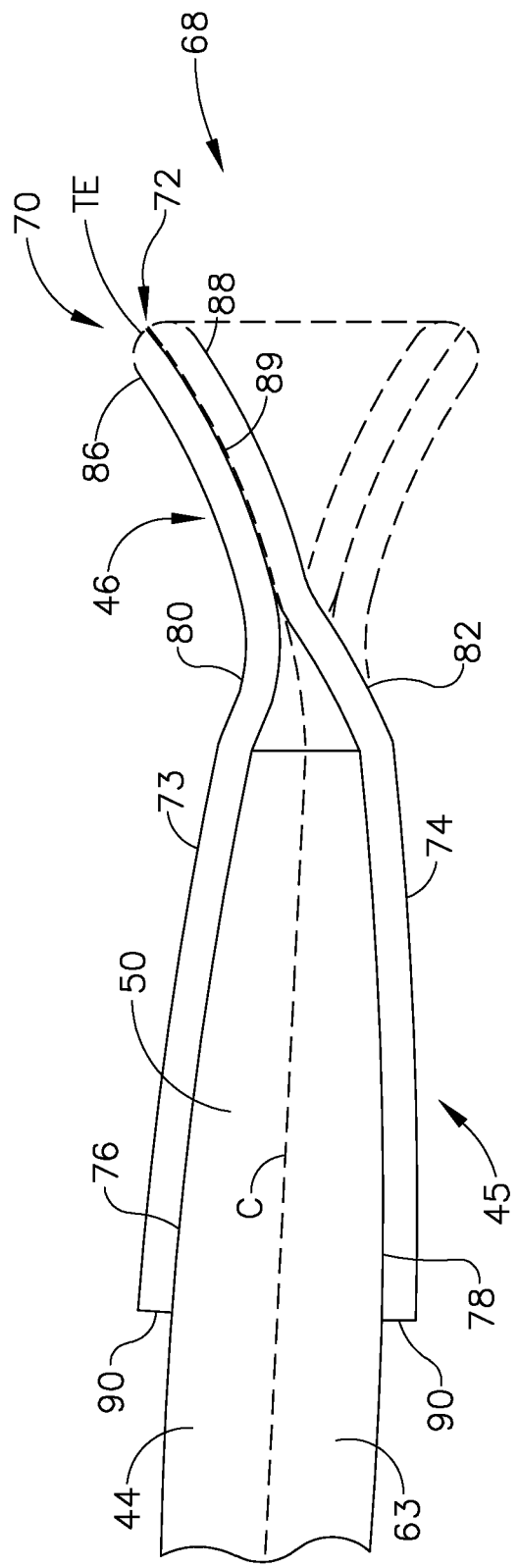
FIG. 3 is a cross-sectional diagrammatical view illustration of a composite core trailing edge and metallic trailing edge of the blade taken through 3-3 in FIG. 2.

Referring to FIGS. 2 and 3, the airfoil 45 includes a composite core 44 and trailing edge cladding 46 that provides the airfoil's trailing edge TE. Demarcation line 59 indicates the intersection of the composite core 44 and metallic trailing edge cladding 46. The composite core 44 is made of a composite material, generally airfoil shaped, and incudes a central core portion 63 extending chordwise downstream from a leading edge portion 48 to a trailing edge portion 50 of the composite core 44. The trailing edge cladding 46 is made of any suitable material that is stronger or more ductile or less brittle than the composite material of the composite core 44.

The trailing edge cladding material is illustrated herein as being metallic. Another less brittle and suitable cladding material is S-glass such as HS2 and HS4 which are high strength glass fibers made from magnesium alumina silicate. The leading edge portion 48 may or may not be covered by leading edge cladding 66 made of a metallic or other suitable material and which would then define the leading edge LE of the airfoil 45.

The trailing edge cladding 46 includes a fluted or wavy wall 70 and the trailing edge TE designed to reduce noise during the engine's operation and, thus, lower the acoustic signature of the airfoil 45. The wavy wall 70 is designed to mix the fan wakes to reduce the wake interaction with downstream outlet guide vanes (OGV). The wavy wall 70 includes waves 68 such as crenelations or undulations 72. This allows the peak strain caused by the wavy wall 70, which is an aerodynamic feature stress, to be born by the metallic trailing edge cladding 46. The metallic trailing edge cladding 46 is far more capable of bearing strain than the composite core 44.

Referring to FIG. 3, the metallic trailing edge cladding 46 is bonded to the trailing edge portion 50 of the composite core 44. The bonding uses a film adhesive for example. The trailing edge cladding 46 includes pressure and suction side flanks 73, 74 that are bonded to pressure and suction side surfaces 76, 78 respectively of the trailing edge portion 50 of the composite core 44. The waves 68 of the wavy wall 70 extend normal to and away from the pressure and suction side surfaces 76, 78. Thus, the wavy wall 70, representative of a sculptured trailing edge (STE) feature, is entirely made of metal and better able to withstand peak stresses and strains that peak in the STE feature itself than composite airfoils or composite portions of airfoils. The metallic trailing edges have a higher strain capability as compared to the composite core based on pure material property evaluation. Bonding metallic STE features to the composite core allows stresses transferred to the composite core to be spread out over a large area and, thus, lowering localized stress and strain that may fail a composite airfoil. The airfoil 45 with the composite core 44 and the metallic trailing edge cladding 46 provides a more capable metallic material which increases robustness of the airfoil and provides weight advantages of composite materials.

The exemplary embodiment of the metallic trailing edge cladding 46 illustrated in FIG. 3 includes radially or spanwise extending wavy pressure and suction side trailing edge guards 80, 82 made of sheet metal. The pressure and suction side trailing edge guards 80, 82 provide the wavy shape of the metallic trailing edge cladding 46. The metal cladding may be hot formed to shape. The pressure and suction side trailing edge guards 80, 82 are bonded to the pressure and suction side surfaces 76, 78 respectively of the composite core 44. Contacting pressure and suction side portions 86, 88 of the pressure and suction side trailing edge guards 80, 82 are bonded together as indicated along bond line 89.

The pressure and suction side trailing edge guards 80, 82 diagrammatically illustrated in FIG. 3 have an upstream or forward facing step 90 that should be aerodynamically covered. Thus, this part of the metallic cladding is blended into the composite core 44. FIG. 4 illustrates one design to hide the step 90 by providing a small rebate 92 into the composite core 44 to keep the pressure and suction side flanks 73, 74 flush with the composite core 44. Alternatively, as diagrammatically illustrated in FIG. 5, an erosion coating 96 butting up to the step 90 may be placed on the composite core 44.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

What is claimed is:

1. A gas turbine engine airfoil comprising:
chordwise spaced apart leading edge and trailing edge,
pressure and suction sides extending outwardly in a spanwise direction from an airfoil base to an airfoil tip,
trailing edge cladding made of a cladding material bonded to a composite core made of a composite material wherein the cladding material is less brittle than the composite material,
the composite core including a central core portion extending chordwise downstream from a leading edge portion to a trailing edge portion of the composite core, the composite core and the trailing edge cladding being free of crenelations and forming a smooth surface in a spanwise direction in the region of their bonding, and
the trailing edge cladding including a first portion overlapping the trailing edge portion of the composite core and a second portion having a wavy wall that is spaced apart from and extends beyond the trailing edge portion of the composite core, extending beyond the trailing edge portion of the composite core, such that the wavy wall of the trailing edge cladding forms a sculptured trailing edge feature confined to the trailing edge cladding and the composite core is free from sculptured trailing edge features.

2. The airfoil as claimed in claim 1, wherein the first portion comprises pressure and suction side flanks bonded to pressure and suction side surfaces respectively of the trailing edge portion of the composite core.

3. The airfoil as claimed in claim 1, further comprising waves of the wavy wall extending normal to and away from the pressure and suction side surfaces.

4. The airfoil as claimed in claim 1, further comprising the trailing edge cladding including spanwise extending wavy pressure and suction side trailing edge guards including waves of the wavy wall.

5. The airfoil as claimed in claim 4, further comprising the wavy pressure and suction side trailing edge guards being made of sheet metal.

6. The airfoil as claimed in claim 5, wherein the first portion comprises pressure and suction side flanks bonded to pressure and suction side surfaces respectively of the trailing edge portion of the composite core.

7. The airfoil as claimed in claim 6, further comprising the waves of the wavy wall extending normal to and away from the pressure and suction side surfaces.

8. The airfoil as claimed in claim 6, further comprising forward facing steps on the pressure and suction side flanks of the trailing edge cladding and an erosion coating covering the composite core and butting up against and hiding the steps.

9. The airfoil as claimed in claim 6, further comprising forward facing steps on the pressure and suction side flanks of the trailing edge cladding and rebates extending into the composite core and hiding the steps.

10. A gas turbine engine fan blade comprising:
an airfoil extending outwardly from a platform of the blade,
the airfoil extending between chordwise spaced apart leading edge and trailing edge,
the airfoil including pressure and suction sides extending outwardly in a spanwise direction from an airfoil base at the platform to an airfoil tip,
the airfoil including trailing edge cladding made of a cladding material bonded to a composite core made of a composite material wherein the cladding material is less brittle than the composite material,
the airfoil including the composite core including a central core portion extending chordwise downstream from a leading edge portion to a trailing edge portion of the composite core the composite core and the trailing edge cladding being free of crenelations and forming a smooth surface in a spanwise direction in the region of their bonding, and
the trailing edge cladding including a first portion overlapping the trailing edge portion of the composite core and a second portion having a wavy wall that is spaced apart from and extends beyond the trailing edge portion of the composite core, extending beyond the trailing edge portion of the composite core, such that the wavy wall of the trailing edge cladding forms a sculptured trailing edge feature confined to the trailing edge cladding and the composite core is free from sculptured trailing edge features.

11. The blade as claimed in claim 10, wherein the first portion comprises pressure and suction side flanks bonded to pressure and suction side surfaces respectively of the trailing edge portion of the composite core.

12. The blade as claimed in claim 10, further comprising waves of the wavy wall extending normal to and away from the pressure and suction side surfaces.

13. The blade as claimed in claim 10, further comprising the trailing edge cladding including spanwise extending wavy pressure and suction side trailing edge guards including waves of the wavy wall.

14. The blade as claimed in claim 13, further comprising the wavy pressure and suction side trailing edge guards being made of sheet metal.

15. The blade as claimed in claim 14, wherein the first portion comprises pressure and suction side flanks bonded to pressure and suction side surfaces respectively of the trailing edge portion of the composite core.

16. The blade as claimed in claim 15, further comprising the waves of the wavy wall extending normal to and away from the pressure and suction side surfaces.

17. The blade as claimed in claim 16, further comprising forward facing steps on the pressure and suction side flanks of the trailing edge cladding and an erosion coating covering the composite core and butting up against and hiding the steps.

18. The blade as claimed in claim 16, further comprising forward facing steps on the pressure and suction side flanks of the trailing edge cladding and rebates extending into the composite core and hiding the steps.

19. The blade as claimed in claim 10, further comprising a root extending inwardly from the platform.

20. The blade as claimed in claim 19, further comprising the root including an integral dovetail.

21. The blade as claimed in claim 20, wherein the first portion comprises pressure and suction side flanks bonded to pressure and suction side surfaces respectively of the trailing edge portion of the composite core.

22. The blade as claimed in claim 20, further comprising waves of the wavy wall extending normal to and away from the pressure and suction side surfaces.

23. The blade as claimed in claim 20, further comprising the metallic trailing edge cladding including spanwise extending wavy pressure and suction side trailing edge guards including the waves of the wavy wall.

24. The blade as claimed in claim 23, further comprising the wavy pressure and suction side trailing edge guards being made of sheet metal.

25. The blade as claimed in claim 24, wherein the first portion comprises pressure and suction side flanks bonded to pressure and suction side surfaces respectively of the trailing edge portion of the composite core.

26. The blade as claimed in claim 25, further comprising waves of the wavy wall extending normal to and away from the pressure and suction side surfaces.

27. The blade as claimed in claim 26, further comprising forward facing steps on the pressure and suction side flanks of the trailing edge cladding and an erosion coating covering the composite core and butting up against and hiding the steps.

28. The blade as claimed in claim 26, further comprising forward facing steps on the pressure and suction side flanks of the trailing edge cladding and rebates extending into the composite core and hiding the steps.

\* \* \* \* \*